Nov. 28, 1961  J. C. KINLEY  3,010,212
CALIPERING TOOLS
Filed April 18, 1957  6 Sheets-Sheet 1

John C. Kinley
INVENTOR.

BY Hayden & Pravel

ATTORNEYS

United States Patent Office 3,010,212
Patented Nov. 28, 1961

3,010,212
CALIPERING TOOLS
John C. Kinley, Houston, Tex.
(1040 N. 6th St., Bellaire, Tex.)
Filed Apr. 18, 1957, Ser. No. 653,649
25 Claims. (Cl. 33—178)

This invention relates to calipering tools, and particularly to pipe calipering tools for indicating surface variations in a pipe such as used in a well.

An object of this invention is to provide a new and improved calipering tool wherein a plurality of feelers are adapted to engage a surface to be calipered, and wherein each of said feelers has a means operable therewith to indicate the movements of each feeler in response to the variations in the surface being calipered.

Another object of this invention is to provide a new and improved calipering tool having a plurality of feelers for engagement with a surface to be calipered, wherein a separate record is produced for each feeler on a chart.

An important object of this invention is to provide a new and improved calipering tool which is capable of producing a record of the surface variations on the inside of a pipe throughout substantially the full circumference at each elevation in the pipe, so that the circumferential extent and location of defects or pits in the pipe at each elevation are indicated.

Another object of this invention is to provide a new and improved calipering tool which is particularly adapted for indicating surface variations on the inside surface of a pipe, wherein a plurality of feelers are provided for contact with said surface as said tool is moved longitudinally through the pipe, and wherein the lateral movements of each feeler in response to said surface variations are transmitted to a recorder means accurately, but with a minimum of movement relative to the recording means or chart, so that even though a separate record is produced for each feeler, such records can be obtained on a relatively small chart.

An additional object of this invention is to provide a new and improved calipering tool having one or more feelers for engagement with the surface to be calipered, wherein each of said feelers is mounted for bending in response to the variations in the surface being calipered, and wherein such bending movements of the feeler are transmitted to an indicator or recorder means.

Another object of this invention is to provide a new and improved calipering tool wherein the lateral movements of each feeler thereof are converted into longitudinal or lateral movements of a recorder means or stylus therewith by causing a portion of each feeler to bend in response to the surface variations encountered and by transmitting such bending movements to the recorder means or stylus therewith, so that the longitudinal or lateral movements of each recorder means or stylus are in accordance with the surface variations encountered by each feeler.

A further object of this invention is to provide a new and improved feeler construction for a calipering tool wherein a portion of the feeler is bent in response to variations in a surface encountered thereby, and wherein another portion of the feeler is placed under a strain or is deformed and such strain is converted into longitudinal or lateral movement of a recorder member for obtaining a record of the variations in the surface encountered by the feeler.

A still further object of this invention is to provide a new and improved pipe calipering tool for making a record from which corrosion pits, rings, and other corrosion areas can be distinguished and indicated as to their extent, area, shape and penetration at each elevation in a pipe which is calipered.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figures 1, 3, 4:
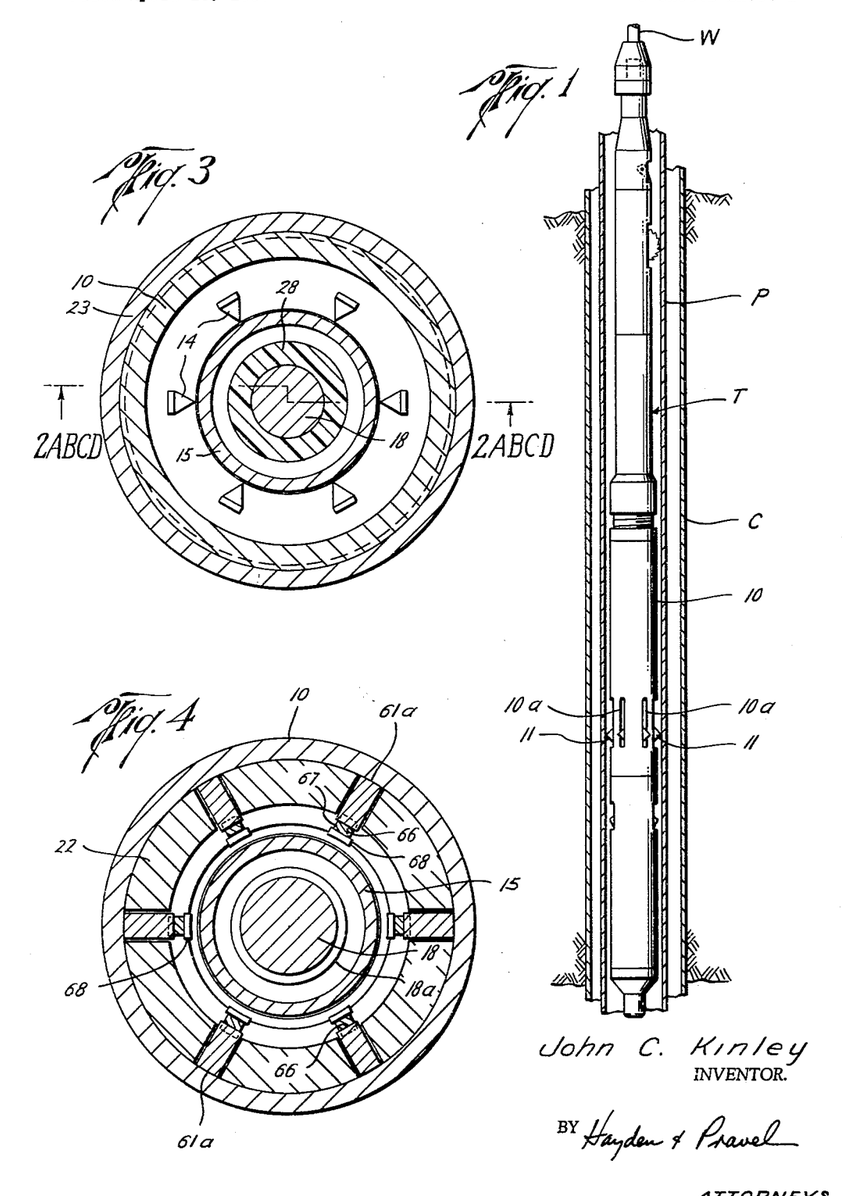
FIG. 1 is an elevation illustrating the calipering tool of this invention in a tubing string or pipe in a well.
FIG. 3 is a cross-sectional view taken on line 3—3 of FIG. 2C, and, as indicated therein, FIGS. 2A, 2B, 2C and 2D have been cut on the section line shown in FIG. 3.
FIG. 4 is a cross-sectional view taken on line 4—4 of FIG. 2C.

In the drawings, the letter T designates generally the calipering tool of this invention which is adapted to be lowered into a well tubing or other pipe P on a wire line W or any other support extending from the surface of the well. Normally, the tubing or pipe P which is to be calipered with the calipering tool T of this invention is located within a well casing C, although the well casing C may itself be calipered in some instances. Briefly, the calipering tool T includes a housing 10 which extends for substantially the full length of the calipering tool T and which has a plurality of slots or longitudinal openings 10a therethrough and through which the contact heads 11 of feelers F (FIG. 2C) extend for contact with the inner surface of the tubing or pipe P which is being calipered with the tool T. As will be explained in more detail, a separate record is made for each feeler F and the feelers are so constructed and so mounted in the housing 10 that the record produced is reduced in scale as compared to the amount of the variations in the inner surface of the tubing or pipe P being calipered, whereby a relatively small record can be obtained for a relatively long length of the tubing or pipe P which is calipered. Since a separate record is produced for each feeler F, the tool of this invention makes it possible to distinguish on the record between various types of corrosion or other defects in the inside surface of the tubing or pipe P, because isolated pits will be readily distinguished from ring corrosion and other circumferential area corrosion and because the extent, area and shape of the corrosion can be readily determined. It can thus be determined whether or not the corrosion is extensive enough at any elevation in the pipe to result in immediate or possible failure of the pipe.

Considering the invention in detail, the housing 10 is formed in a plurality of sections which are threaded or otherwise suitable connected together to form the complete housing 10. The feelers F are mounted within the central portion of the housing 10 (FIG. 2C), as will be explained more in detail hereinafter, and each feeler F has a recorder member or stylus 14 operatively connected therewith for making a record on a chart or recording means 15. Such record on the chart 15 is indicative of the variations in the inner surface of the pipe P, as will be more fully explained.

In the preferred embodiment of this invention, the chart 15 is a cylindrical or tubular chart which is threaded or otherwise suitably connected to spaced rings 16 and 17. The lower ring 17 has internal threads 17a which are preferably acme threads or similarly relatively coarse threads, which are adapted to engage and coact with external threads 18a on the rod 18. The rod 18 is fixed against movement at its lower end with a screw 20 which is threaded into the lower end of the rod 18 and which has its head 20a within a centrally located recess 22a of an inner cage 22 within the central portion of the housing 10. The inner cage 22 is fixed in the housing 10 by positioning the lower end 22b of the cage 22 on an annular shoulder 10b within the housing 10, and by threading the lateral annular shoulder 10c into contact with the upper end 22c of the cage 22. Threaded lock rings 23 are preferably provided to lock the shoulder 10c in contact with the end 22c.

Thus, with the cage 22 fixed in the housing 10, the lower end of the threaded rod 18 is likewise fixed in the housing 10 due to the clamping action provided by the threaded screw or similar retaining means 20. The rod 18 extends upwardly within the housing 10 and it is provided with a smooth surface 18b above the threads 18a. At the extreme upper end 18c of the rod 18, the diameter of the rod 18 is reduced and such end 18c is mounted in suitable bearings at 25. The bearings 25 are carried by a cup-shaped lower end 26a on a shaft 26, so that, as will be more fully explained, the shaft 26 may be rotated without imparting rotation to the rod 18, but since the shaft 26 is held against lateral shifting, the end 18c of the rod 18 is likewise held against lateral shifting by reason of its mounting in the bearings 25.

For transmitting the rotation of the shaft 26 to the chart 15, a drive sleeve 27 (FIG. 2B) is mounted in a position externally of the rod 18 for rotation relative thereto. The lower end of the drive sleeve 27 is mounted on a bearing ring 28 which rests upon an annular lateral shoulder 18d formed just above the threads 18a. The drive sleeve 27 is confined against upward movement relative to the rod 18 by a bearing plate 29 (FIG. 2B) which is preferably held on the rod 18 with a retaining screw 30. A lug 26b extends from the bearing cup 26a of the shaft 26 for engagement with corresponding lugs 27a at the upper end of the sleeve 27, so as to impart the rotation from the shaft 26 to the sleeve 27. A longitudinally extending key 31 is mounted on the external surface of the drive sleeve 27 for positioning a suitable keyway 16a in the upper ring 16 of the chart 15. Thus, as the drive sleeve 27 is rotated by the shaft 26, the chart 15 is rotated which results in a threading of the internally threaded ring 17 upwardly on the threads 18a of the rod 18. By reason of the key 31 and the keyway 16a, the chart 15 is permitted to move longitudinally upwardly relative to the rod 18 while moving rotationally with respect thereto. The dotted line position of the chart 15 in FIG. 2B indicates the travel of the chart 15. Since the chart 15 moves in a rotaitonal and a longitudinal direction at the same time, it actually follows a path which may be described as helical, the pitch of which depends upon the pitch of the threads 18a and 17a. Therefore, assuming the stylus members 14 are simply contacting the chart 15 during such rotational and longitudinal movement of the chart 15, each of the styluses 14 would produce a helical, or substantially helical, record. However, as will be explained, due to the variation in the surface of the pipe being calipered, such lines are not smooth or regular lines.

Figures 2A, 2B:
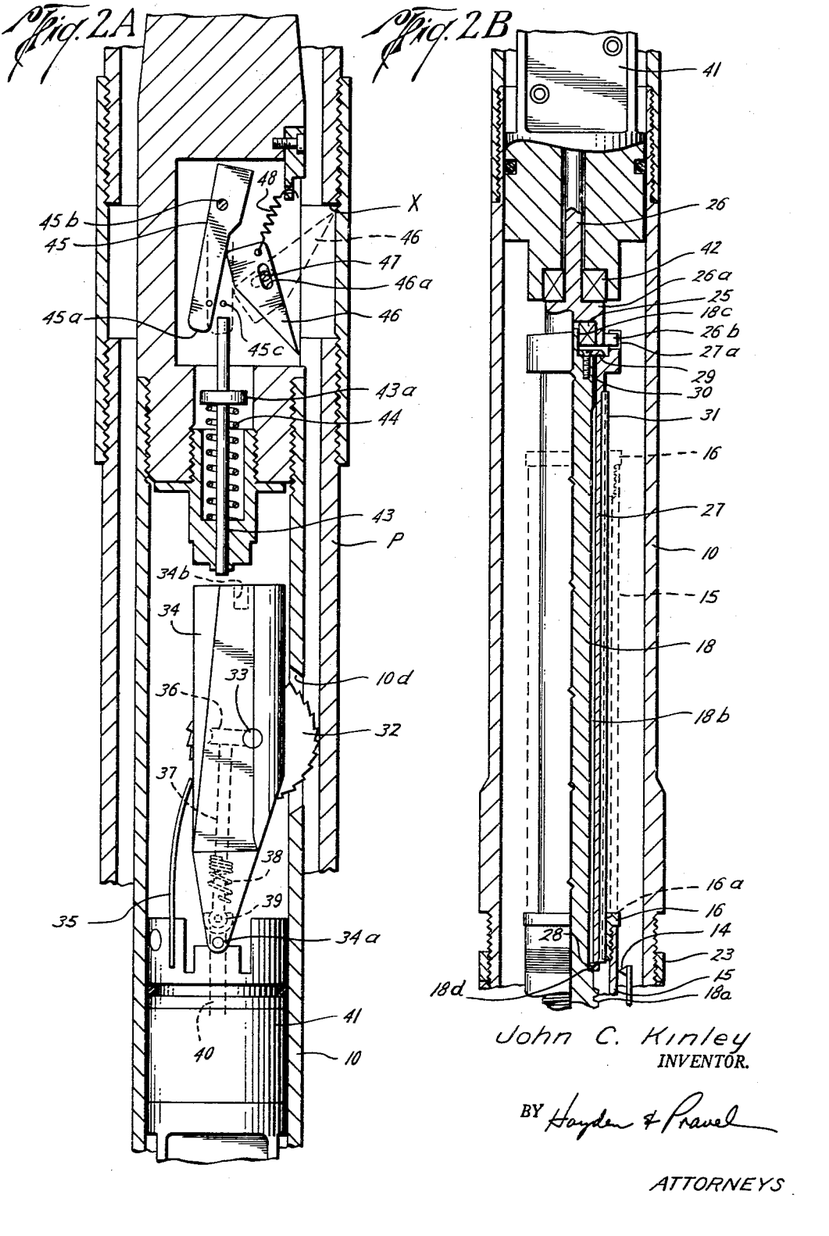
FIGS. 2A, 2B, 2C and 2D are views, partly in section and partly in elevation, illustrating the details of the calipering tool of this invention from its upper end to its lower end, respectively.

Although various means may be utilized for rotating the shaft 26 for thereby imparting the rotational and longitudinal movement to the chart 15, the preferred construction for accomplishing such movement of the chart 15 is illustrated in particular in FIG. 2A and a portion of FIG. 2B. As shown therein, a drive wheel 32 is mounted on an axle 33 which is supported by a support bar or member 34 so that the drive wheel 32 is rotatable relative thereto. The wheel 32 is adapted to extend through an opening 10d in the housing 10 for contact with the inner surface of the pipe P so that rotation is imparted to the wheel 32 by the longitudinal movement of the entire calipering tool T through the pipe P during the calipering operation. The wheel 32 is urged outwardly into contact with the inner surface of the pipe P by a resilient leaf spring 35, or any other resilient means which acts against the bar or member 34, to cause same to pivot laterally about its pivot support point 34a. A pinion gear 36 (dotted lines) is engaged with and driven by a suitable worm gear (not shown) which is on the axle or shaft 33, so that the rotation of the drive wheel 32 is imparted to the gear 36 for turning the shaft 37 (dotted lines). Preferably, a one-way clutch 38 and a flexible joint 39 are used for connecting the shaft 37 with a lower shaft 40 so that rotation is imparted to the shaft 40 only when the wheel 32 is being moved upwardly relative to the pipe P (clockwise direction as viewed in FIG. 2A). The shaft 40 is shown in dotted lines and the end thereof is connected with suitable gears (not shown) in the gear box housing 41, so as to transmit the rotation of the shaft 40, preferably with a suitable speed reduction, to the shaft 26 extending from the lower end of the gear box 41 (FIG. 2B). The gears within the gear box 41 are not illustrated because they are conventional in construction. Bearings 42 are illustrated for the shaft 26, and it will be appreciated that bearings may be utilized in various other places to reduce friction and to provide support in connection with the parts used for transmitting the rotation of the drive wheel 32 to the shaft 26.

For holding the drive wheel 32 out of engagement with the inner surface of the tubing or pipe P as the calipering tool T is lowered or moved in non-calipering direction, the upper end of the bar or member 34 is provided with a recess 34b which is adapted to receive a latching pin 43 which is longitudinally movable relative to the bar or member 34. A spring 44 or any other resilient means acts on a bar 43a to urge the locking pin 43 upwardly, but during the lowering of the calipering tool T in the pipe P in the non-calipering direction, the locking pin 43 is held in a lowered position with its lower end in the recess 34b by reason of the engagement of the upper end of the pin 43 with the lower end 45a of a locking bar 45. The arm 45 is pivoted at the pivot rod 45b and it is normally held in the position with its lower end 45a in contact with the upper end of the pin 43 by a shear pin 45c, such normal position being indicated by dotted lines in FIG. 2A. A release dog or member 46 is pivotally mounted about a pivot pin 47, and a spring 48 toward the rear of the dog 46 maintains same in the dotted line position during the running in of the calipering tool T into the pipe P. In such position, the upper left corner of the dog 46 contacts the latching arm 45, but the dog 46 remains free to move about the pivot rod 47 in a counterclockwise direction from its contact with the arm 45. Thus, the dog 46 slides along the interior of the pipe P as the calipering tool T is moved downwardly in the pipe P. However, upon the movement of the calipering tool T in an upward direction relative to the pipe P, the dog 46 engages with a lateral end X at a pipe joint in the string of tubing or pipe P, so as to impart a clockwise movement to the dog 46 about the pivot pin 47. A lateral movement is imparted to the arm 45 as the dog 46 is urged in a clockwise direction, so as to effect such shearing or severing of the shear pin 45c. The spring 48 is then able to move the dog 46 to its inactive position (the solid lines in FIG. 2A) by reason of the eccentric opening 46a and the position of the spring 48, as shown in FIG. 2A. When the pin 45c has been sheared, the resilient means or spring 44 urges the locking pin 43 upwardly so that the leaf spring 35 then moves the arm or member 34 to the right, as viewed in FIG. 2A, to cause the wheel 32 to engage with the inside surface of the pipe P. Thereafter, movement of the calipering tool T imparts a movement to the shaft 26 as previously explained.

Figures 2C, 2D:
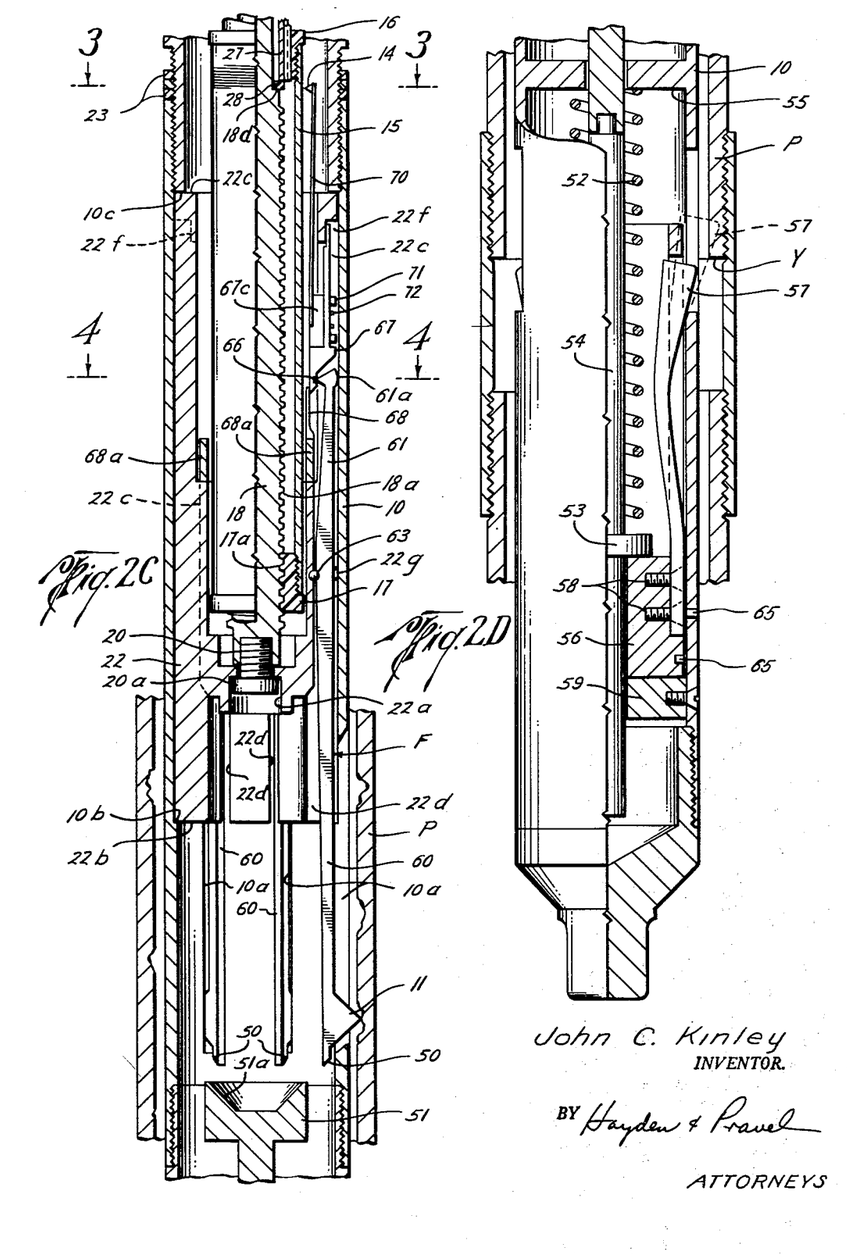

It is also desirable to hold the feelers F in an inactive position out of contact with the inner surface of the tubing or pipe P as the calipering tool T is moved in a non-calipering direction. One means for latching such feelers F in an inactive position during the movement of the calipering tool T in a non-calipering direction is illustrated in FIG. 2D and the lower portion of FIG. 2C. Each of the feelers F has a downwardly extending projection 50, which projections are adapted to fit within a recess 51a of a latching head 51 when such head 51 is in its raised or upper position. The latching head 51 is urged in a downward direction by a spring 52 or other resilient means which acts on a ring or plate 53 on a shaft 54. The upper end of the spring 52 acts against an annular shoulder 55 within the lower portion of the housing 10. The ring or plate 53 preferably rests upon an annular block 56 which has mounted thereon a resilient release finger 57. Such finger 57 may be mounted on the block 56 with screws 58 or any other suitable securing means. During the lowering of the calipering tool T in the tubing or pipe P being calipered, the coil spring 52 is held in a compressed condition by holding the support block 56 raised relative to a stop plate 59 with a shear pin 65, which extends through the support block 56 and the housing 10. When the support block 56 is held in such raised position, the latching head 51 has the projections 50 of the feelers F confined within the recess 51a to hold same in a retracted position. Also, when the block 56 is in the raised position with the spring 52 under compression, the inherent resiliency of the flexible finger 57 urges same outwardly into constant engagement with the inside surface of the tubing or pipe P. As the tool T is lowered in the pipe P, the finger 57 moves in and out of the tool joints which it passes, but upon a movement of the calipering tool T in an upward direction relative to the tubing or pipe P, the finger 57 engages with the shoulder such as indicated by the letter Y (FIG. 2D) of a tubing or pipe joint, so that a downward force is applied to the shear pin 65 to shear same. Thus, the finger 57 moves from its dotted line position of FIG. 2D to its solid line position, and the spring 52 causes a retraction of the latching head 51 to its lower position whereby the feelers F are released for contact with the inner surface of the pipe P.

Considering now the details of the construction of the feelers F and the mounting means therefor, such structure is shown in FIGS. 2C, 5A, 5B, 6, 7 and 8. Each of the feelers F is positioned in one of the longitudinal slots 22d in the inner cage 22 and extending for substantially the full length thereof. Each feeler F is in effect a beam which has a bending or flexing portion 60 which is adapted to bend or flex or otherwise move in accordance with the variations in the surface of the pipe P encountered by its contact head 11. Each feeler F also has another portion 61 which is adapted to be deformed or placed under a strain, or stated otherwise, which is subjected to a bending movement in accordance with the amount of bending or flexing or movement of the portion 60 thereof. At a midway point between the bending portion 60 and the strain portion 61 of each feeler F, a support or mounting is provided to prevent longitudinal movement of the feeler F relative to the inner cage 22 and to serve as a fulcrum when the bending moment is imparted to each feeler F. In the form of the invention shown in FIGS. 2C, 5A, 5B and 6-8, such support point is provided by a ball 63 which is positioned in a recess or groove 22e formed in the external surface of the inner cage 22. The sides or walls of each recess or groove 22e are tapered so that the ball 63 projects from the external surface of the cage 22 and fits within a mating recess 64 in each feeler F. For assembling purposes, curved sides 22g are provided in the walls of each slot 22c to facilitate the positioning of each ball 63 in each recess or groove 22e.

Figures 5A, 5B, 6, 7, 8:
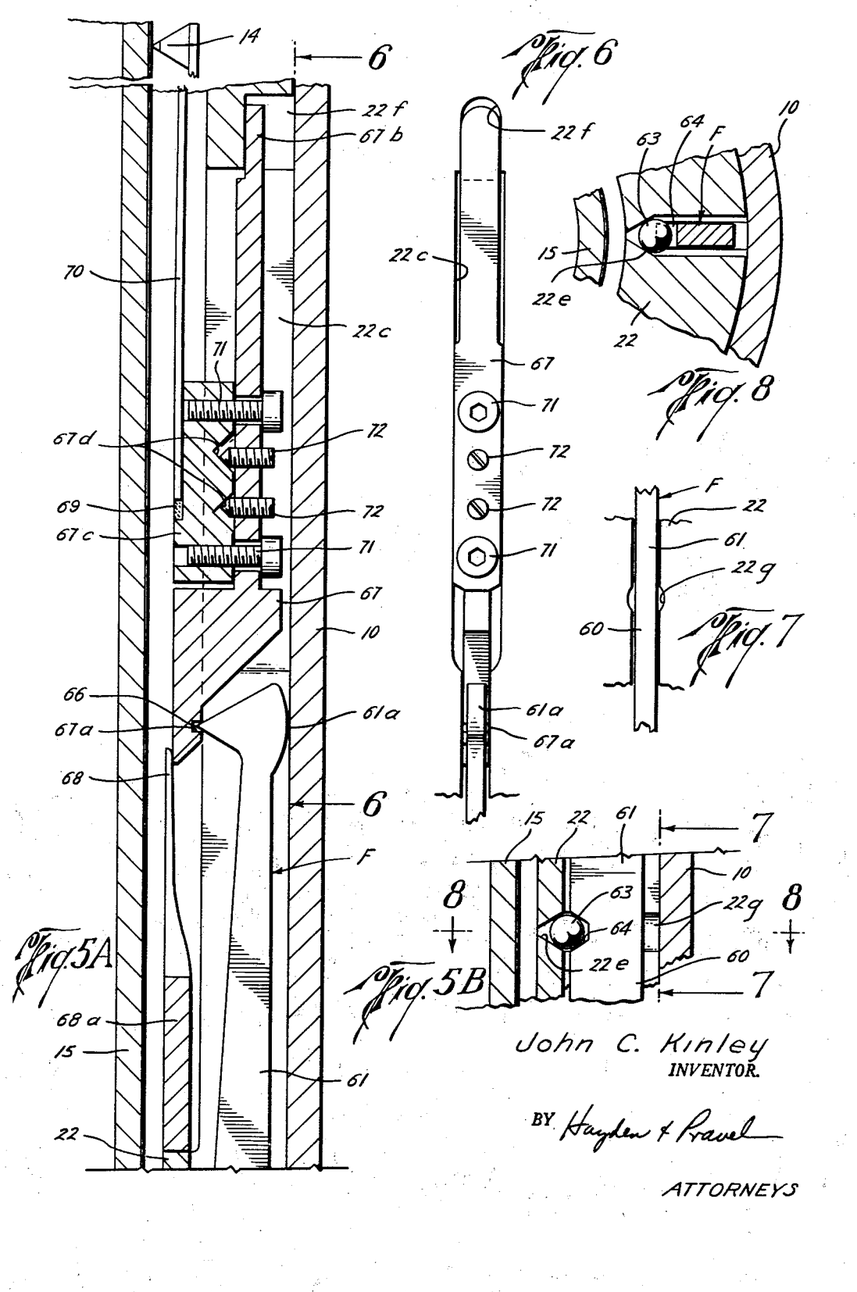
FIG. 5A is an enlarged partial sectional view taken from FIG. 2C to show some of the details thereof.
FIG. 5B is another enlarged partial sectional view taken from FIG. 2C to show additional details thereof.
FIG. 6 is an elevation taken on line 6—6 of FIG. 5A.
FIG. 7 is a view taken on line 7—7 of FIG. 5B.
FIG. 8 is a view taken on line 8—8 of FIG. 5B.

The strain portion 61 is prevented from moving laterally by the confinement of its contact surface 61a in contact with the inner surface of the housing 10. Each feeler F is formed of a resilient material such as spring steel and it is so shaped that the inherent resiliency of the feeler F tends to urge the contact head 11 and the contact surface 61a outwardly so that the contact surface 61a remains in constant contact with the inside surface of the housing 10 as the head 11 moves inwardly and outwardly in response to the variations in the surface being calipered. Thus, as each feeler F moves inwardly from its maximum outward position, which is the position at which the projection 50 contacts the inside surface of the housing 10, the lateral force acting on the upper end of the feeler F is increased so that the contact of the contact surface 61a with the inside surface of the housing 10 is assured throughout all lateral bending or flexing of the portion 60 of each feeler F. Because each feeler F is confined against longitudinal movement at the ball 63 and is confined against lateral movement by its contact with the housing 10 at its surface 61a, the bending or flexing of the bending portion 60 in response to the variations in the surface of the pipe P causes the strain portion 61 to be placed under a strain or to be deformed in accordance with the particular amount of bending or flexing of the portion 60. Such strain or deformation is converted into relatively small increments of longitudinal movement at the transmitting head or point 66 (FIG. 5A). The movements of the transmitting head or point 66 are on a reduced scale as compared to the extent of bending or flexing of the portion 60, but they are in the same relative amounts. Therefore, the movements of the head or point 66 correspond with the variations in the internal surface of the tubing or pipe P being calipered, but such movements of the head 66 are on a reduced scale as compared to the amount of the variations in the surface of the pipe P.

Each of the transmitting heads 66 is operatively connected with one of the stylus members 14 through a stylus mounting assembly 67 (FIGS. 2C and 5A). Each stylus mounting assembly 67 has a notch 67a into which the transmitting head 66 extends so that the longitudinal movements of each transmitting head 66 are transmitted to the stylus mounting assembly 67 therewith. The upper end 67b of the assembly 67 is confined within a recess 22f at the upper end of each slot 22c to permit the relative longitudinal movement of the stylus mounting assembly 67 relative to the inner cage 22 and the housing 10, but while still preventing the inward movements of the assembly 67 with respect to the cage 22. Also, the lower end of each assembly 67 is urged towards its transmitting head 66 by a resilient spring finger 68 which bears against the inner lower end of the assembly 67 (FIG. 5A). The finger 68 is actually formed with all the other fingers 68 used with each of the stylus assemblies 67 and such fingers 68 are joined together with an angular ring 68a at the bottom thereof to form a cluster of the spring fingers 68 which fit within the inner cage 22.

The stylus mounting assemblies 67 include an adjustable block 67c to which is welded at 69 a stylus support arm 70. The stylus 14 is carried at the upper end of the arm 70 in the usual case. The adjustable block 67c is held in a fixed position by screws 71, but when it is desired to change the position of the stylus 14 relative to the chart 15, the screws 71 may be loosened and then adjusting screws 72 may be turned for coaction with the tapered surfaces 67d for causing the adjusting block 67c to shift relative to the main portion of the stylus mounting assembly 67. When the adjusting block 67c has been moved to its desired position by the adjustment of the adjusting screws 72, the screws 71 are again tightened to clamp the adjusting block 67c with the main part of the mounting assembly 67.

In the operation or use of the form of the invention illustrated in FIGS. 1–8, the calipering tool T is lowered or moved in a non-calipering direction in the tubing or pipe P which is to be calipered. During such lowering or movement in the non-calipering direction, the release dog 46 is in the dotted line position of FIG. 2A, so that it slides along the inside of the pipe P and swings or pivots about the pivot pin 47 without applying any force or pressure to the locking arm 45. Therefore, the locking arm 45 remains in the dotted line position (FIG. 2A) with the latching or locking pin 43 held in its lowered position in the notch or recess 34b, whereby the drive wheel 32 is held out of contact with the inside surface of the pipe P. Therefore, as the tool T is lowered or moved in a non-calipering direction, the chart 15 is inactive or stationary within the housing 10.

Also, during the lowering or moving of the calipering tool T in the non-calipering direction, the feelers F are held in the retracted or inactive position out of contact with the inner surface of the tubing or pipe P, because the latching head 51 is in its raised position with the projections 50 confined within the latching cup 51a of the head 51. The release finger 57 is in its dotted line position (FIG. 2D) so that it travels along the inside surface of the pipe P and flexes as it passes each pipe joint, but it does not impart any shearing force to the shear pin 65, so that the feelers F are maintained in the retracted or inactive position during the lowering of the calipering tool T.

When it is desired to caliper the pipe P and the tool T has been lowered or moved to a position in the pipe P to begin the calipering operation, the tool T is then raised or moved in a calipering direction. Such movement in the calipering direction causes the release dog 46 to engage the shoulder X at one of the pipe joints in the tubing or pipe string P so as to impart a lateral force to the latching bar 45. Such lateral force causes the bar 45 to pivot about the pin 45b for shearing the shear pin 45c. When the bar 45 is moved to the solid line position of FIG. 2A, the latching pin 43 is released so that the spring 44 then urges the pin 43 upwardly out of the recess or opening 34b. The spring 35 then moves the drive wheel 32 into contact with the inner surface of the pipe P. When the drive wheel 32 engages the internal surface of the pipe P, continued upward movement of the calipering tool T thus imparts rotation to the chart 15 by the rotation of the drive sleeve 27, as previously explained. Also, as previously explained, the rotation of the chart 15 causes the nut 17 to travel upwardly on the threaded rod 18 in accordance with the pitch of the threads 18a and 17a.

The feelers F are also released upon the movement of the calipering tool T in the upward or calipering direction, due to the fact that the flexible finger 57 engages a lateral shoulder Y at one of the pipe joints in the pipe P so that it can no longer move upwardly and therefore continued upward movement causes the finger 57 to move downwardly to shear the pin 65. When the pin 65 is sheared, the spring 52 acts to move the rod 54 and the latching head 51 downwardly whereby the inherent resiliency of the feelers F urges same outwardly so that the contact heads 11 engage with the inner surface of the pipe P.

If the pipe P had a smooth surface throughout its length, it will be appreciated that each stylus 14 would produce a smooth line which would be helical and which would have the same path of travel as the chart 15 relative to the stylus 14. The only fluctuation in such smooth line would occur at the pipe joints. However, in pipes which are not smooth, but instead have pits, ring corrosion and other circumferential area corrosion of smaller amounts than complete ring corrosion, each feeler F imparts a longitudinal movement to the stylus 14 operatively connected therewith which causes a deflection in the smooth line recorded on the chart 15 by that particular feeler. If ring corrosion exists at an elevation in the pipe P, all of the styluses 14 would move longitudinally so that all record lines would have a deflection for that elevation in the pipe P. If there are several pits, or if there is circumferential area corrosion of less than complete ring corrosion, there would be deflections in those record lines made by the feelers which move outwardly into such pits or areas of corrosion. It is therefore possible to distinguish between various types of corrosion at each elevation in the pipe surface calipered. In the form of the invention here illustrated, six feelers are shown and, therefore, six styluses 14 are illustrated, since each feeler has its own stylus. In actual practice, fifteen or more feelers F would preferably be used because it is desirable to have as many feelers contacting the inside surface of the pipe P at each elevation traversed by the calipering tool T as possible, commensurate with the legibility of the record obtained on the chart 15. Due to the fact that the movements of the styluses 14 are on a reduced scale as compared to the amount of the variations in the inside surface of the pipe P, it is possible with this construction of this invention to obtain an accurate legible record on the chart 15, even though a relatively large number of feelers F are utilized with a separate stylus or recorder member 14 for each feeler.

The importance of having the reduced scale recording on the chart 15 will be further appreciated when it is recognized that most of the present-day calipering is conducted in two inch tubing or pipe and, therefore, the size of the chart 15 is necessarily one inch or less in diameter. Also, for physical reasons, the length of the chart 15 is limited and ordinarily would have a length of from about four inches to about twelve inches. With a chart of such relatively small size, tubing lengths of as much as ten thousand feet are calipered. Despite such problems with respect to size, an accurate record can be produced with the construction of this invention even though a relatively large number of stylus members 14 are recording on the same chart.

It should be pointed out that the particular means for driving the chart 15 illustrated in the drawings (particularly FIG. 2A), and the means for latching the feelers F in a retracted position in the non-calipering direction movement of the calipering tool T may be varied within the scope of this invention. For example, the chart 15 can be driven by a clock mechanism such as shown in the M. M. Kinley Patent No. 2,102,080. Other means for driving the chart 15 will also occur to those skilled in the art.

Figures 9, 10, 11, 12, 13:
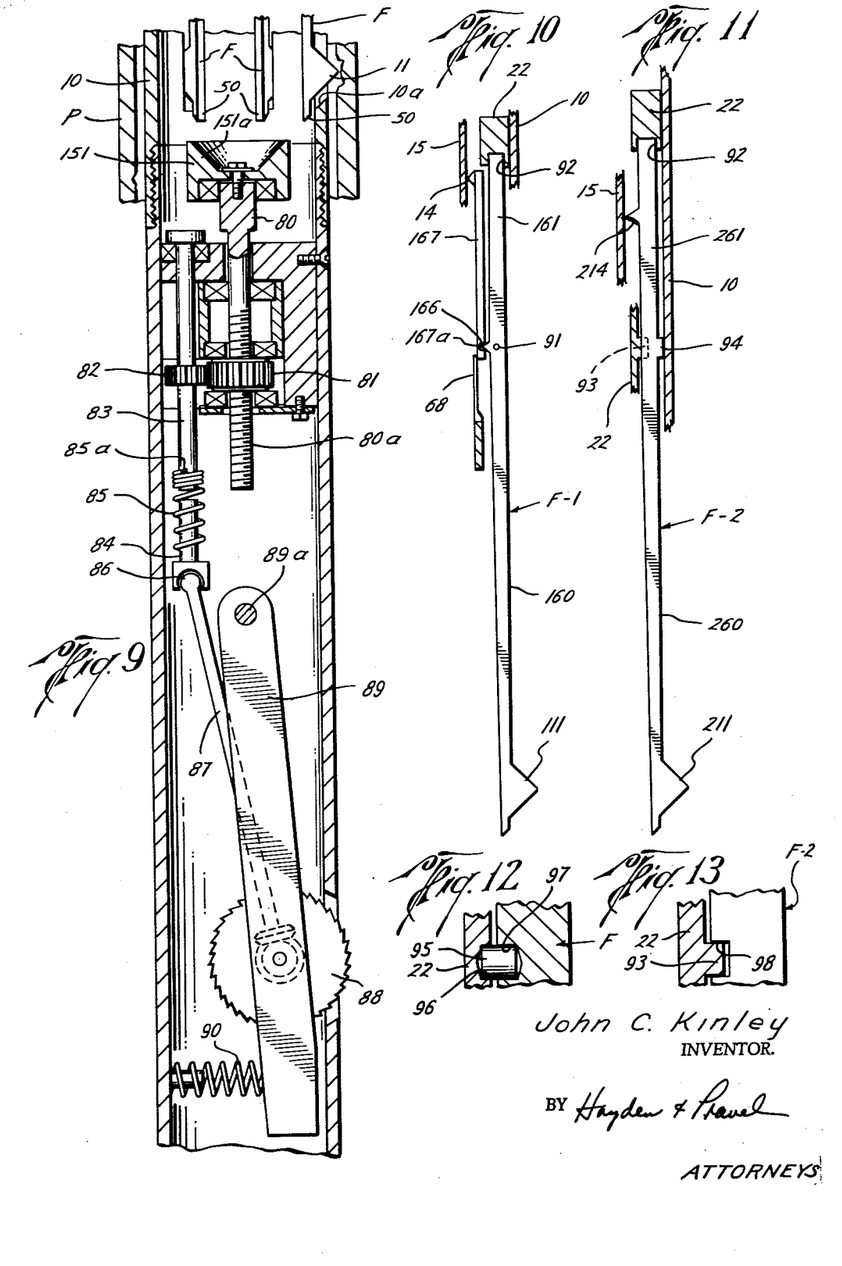
FIG. 9 is a view, partly in section and partly in elevation, illustrating a modified latch and release mechanism for use at a lower end of the calipering tool of this invention.
FIG. 10 is a view, partly diagrammatic, to illustrate a modified feeler construction and mounting therefor.
FIG. 11 is a view similar to FIG. 10, except that it illustrates another modified form of the feeler construction and the means for mounting same.
FIG. 12 is a fragmentary view, partly in section and partly in elevation, illustrating a modified means for mounting the feeler construction in the calipering tool of this invention.
FIG. 13 is a fragmentary view, partly in elevation and partly in section, illustrating another modified means for mounting the feeler construction of this invention in a calipering tool.

Another construction for latching the feelers F and for releasing same when it is desired to caliper a pipe is illustrated in FIG. 9 of the drawings. In such modified form of the feeler latching and release mechanism, the latching head 151 corresponds with the latching head 51 in FIG. 2C. Thus, the latching head 151 has the recess 151a which is adapted to extend upwardly to confine the lower projections 50 of each feeler F to hold the feelers F in a retracted position out of contact with the inner surface of the pipe P. The head 151 is attached to a threaded rod 80 which has external threads 80a formed thereon. Such threads 80a engage with internal threads (not shown) on the inside of a gear 81. Thus, upon a rotation of the gear 81, the threaded rod 80 is moved longitudinally by the co-action of the threads 80a with the internal threads of the gear 81. The gear 81 meshes with a gear 82 carried on a shaft 83. The shaft 83 is connected with a stub shaft 84 by a one-way clutch 85. Such one-way clutch 85 is of known construction and is simply a coil spring which is connected to the shaft 83 by a pin 85a or any other suitable means. The lower portion of the spring or clutch 85 fits tightly around the shaft 84 so that when the shaft 84 turns in one direction, its movement is transmitted to the shaft 83, but upon the rotation of the shaft 84 in the other direction, the shaft 84 simply shifts relative to the spring 85. A knuckle or swivel joint 86 is diagrammatically illustrated for connecting the shaft 84 with a shaft 87 which is rotated upon the rotation of the operating wheel 88 in the known manner. The wheel 88 turns when its engages the internal surface of the pipe P. The support member 89 for holding the operating wheel 88 is mounted at the rod 89a within the housing 10 and it is urged in a lateral direction to maintain the wheel 88 in contact with the inner surface of the pipe P by a spring or other resilient means 90. With the construction shown in FIG. 9, the wheel 88 contacts the pipe P as the calipering tool T is lowered in the pipe P or is moved in the non-calipering direction, but due to the presence of the one-way clutch 85, such movement is not transmitted to the shaft 83. Therefore, the latching head 151 is maintained in its raised position with the feelers F retracted. However, upon a movement of the calipering tool T in the upward or calipering direction, the movement of the wheel 88 is then transmitted through the one way clutch 85 to the shaft 83 so that the threaded rod 80 is caused to travel downwardly to move the latching head 151 downwardly from the feelers F. Thus, the feelers F are released for contact with the inside surface of the pipe P.

FIGS. 10 and 11 are illustrative of various modifications of the feeler construction and the mounting for same which are possible within the scope of this invention. Thus, in FIG. 10, the feeler F-1 has a contact head 111, a bending or flexing portion 160 and a strain or deformation portion 161, which correspond with the contact head 11, flexing or bending portion 60 and the deformation or strain portion 61 of FIGS. 1-8. Each feeler F-1 is mounted in the housing 10 on a rod 91 or any other support which prevents longitudinal movement of the feeler F-1 relative to the housing 10. The upper end of the feeler F-1 is confined against lateral movement by positioning same within a recess 92 in the inner cage 22. Such recess 92 corresponds with the recess 22f (FIG. 2C) except that the end of the feeler F-1 is held in the recess 92 and such end of the feeler F-1 is prevented from lateral movement by reason of such positioning. In the form of the invention shown in FIG. 10, the transmitting head or point 166 is positioned adjacent the support rod 91 and it moves longitudinally on a reduced scale in response to the bending or flexing of the portion 160 of the feeler F-1. It should be noted that such transmitting head or point 166 moves in an upward direction as the portion 160 bends inwardly, whereas in the form of the invention shown in FIGS. 1-8, the transmitting head 66 moves in a downward direction as the flexing portion 60 moves inwardly, but in both instances, the lateral bending of the portion 160 of each feeler F-1 is converted into longitudinal movement of the transmitting head or point 166. The movements of the transmitting head or point 166 are transmitted to the stylus 14 through a stylus mounting member 167 which has an opening or recess 167a formed therein for receiving the head 166 and which also has a surface 167b in contact with the cage 22 to limit its outward movement. The spring flowers 68 are utilized in the same manner to hold the assembly 167 in a position with the transmitting head 166 in the recess 167a.

In the operation or use of the feeler F-1, as shown in FIG. 10, such feeler would move in response to the variations in the surface being calipered and the bending of the bending of flexing portion 160 would occur in accordance with such variations in the surface being calipered. The strain portion 161 would bow or deform in accordance with the amount of bending or flexing of the flexing portion 160 and, therefore, such strain would be transmitted to the transmitting head or point 166, which converts such strain into longitudinal movement of the stylus 14. Thus, the feeler F-1 functions in the same manner as the feeler F, except for the opposite direction of movement for the stylus 14, as previously explained.

In FIG. 11, the feeler F-2 has a contact head 211, bending or flexing portion 260 and a strain or deformation portion 261, which correspond with the head 11, bending portion 60 and strain portion 61 of each feeler F illustrated in FIGS. 1-8. The inner cage 22 is modified to provide an upwardly extending lug 93 which fits within a mating recess (details of which will be explained in connection with FIG. 13 hereinafter) to hold the feeler F-2 in position in the housing 10 for preventing longitudinal movement thereof. A projection 94 is preferably provided on the external side of each feeler F-2 for contact with the inner surface of the housing 10, or the feeler F-2 can be suitably curved for contact at that point with the housing 10. The upper end of the feeler F-2 is confined against lateral movement in a recess 92 as described in connection with FIG. 10. In the form of the invention shown in FIG. 11, the stylus 214 is mounted directly on the strain portion 261 of the feeler F-2 which causes a lateral or radial movement of the stylus 214 relative to the housing 10 without any appreciable longitudinal movement thereof and even though the upper end of the feeler F-2 does not move laterally or radially relative to the housing 10. Such lateral movement occurs when the flexing or bending portion 260 is caused to bend or flex in response to the variations in the surface being calipered. Thus, a record is produced on the chart 15 which consists of valleys and other indentations which vary in accordance with the indentations or pits encountered by the contact head 211 on the surface being calipered. Thus, as the contact head 211 moves inwardly or in a direction away from the surface being calipered, the stylus 214 is moved in a direction outwardly or towards the surface being calipered. It can therefore be seen that many possible variations of the feeler construction and the means for mounting same are possible within the scope of the present invention.

Specific examples of modified means for mounting the feelers are illustrated in the FIGS. 12 and 13. In FIG. 12, the feeler F is illustrated with a short rod 95 positioned in a recess 96 in the inner cage 22 and a mating recess 97 in the feeler F. Such rod 95 prevents longitudinal movement of the feeler F and is positioned at the point between the bending portion 60 and the strain portion 61. Therefore, such short rod 95 takes the place of the ball 63 illustrated in particular in FIG. 5B.

In FIG. 13, a modified construction is illustrated which has previously been referred to in connection with FIG. 11. Thus, the feeler F-2 has a recess 98 into which a square or rectangular lug or projection 93 extends for preventing longitudinal movement of the feeler F-2. Of course, it should be understood that the constructions illustrated in FIGS. 12 and 13 may be used with any of the various types of feeler constructions described herein and may be varied further than illustrated in accordance with the scope of this invention.

Figure 14:
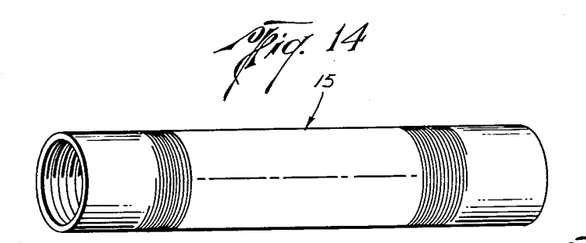
FIG. 14 is a perspective view of a cylindrical chart after a record has been made thereon with a calipering tool of this invention.
Figure 15:
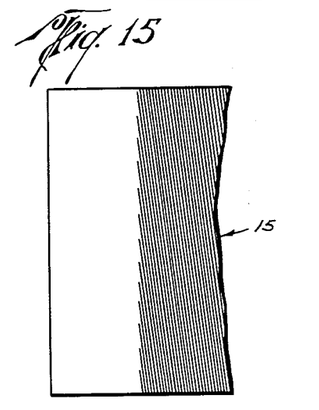
FIG. 15 is a plan view of a portion of the cylindrical chart of FIG. 14 after it has been cut longitudinally and then laid out in a plane.
Figure 16:
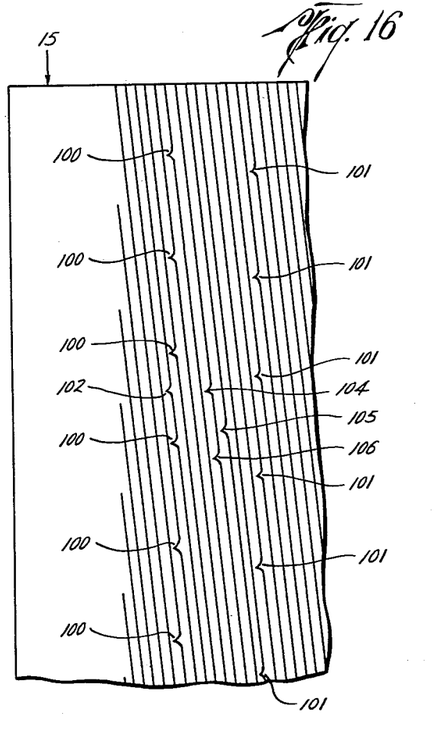
FIG. 16 is a view illustrating an enlarged portion of FIG. 15 to indicate typical deflections or indications in the record lines formed on the chart with the calipering tool of this invention.

In FIG. 14, the chart 15 is illustrated with the record lines formed thereon to indicate the appearance of the chart 15 after the well calipering tool of this invention has been moved through a section of well pipe or tubing. FIG. 15 illustrates a portion of the chart 15 as such chart 15 would appear if it were cut longitudinally and then laid out in a plane. It will be observed that there are fifteen helical record lines illustrated in FIG. 15 to correspond with the preferred number of stylus members 14. Thus, each of the stylus members 14 is in substantially the same circular plane, and to produce the record shown in FIG. 15, such stylus members 14 would be substantially equally circumferentially spaced about the cylindrical chart 15. The indications or deflections which are formed on the record lines as the stylus members 14 are moved longitudinally relative to the chart C due to the contact of its respective feeler or contact head 11 with a surface deflection in the pipe P are not shown in FIG. 15, but typical examples of such deflections or indications are illustrated in FIG. 16. As shown in FIG. 16, the indications or deflections 100 are representative of either a collar or complete ring corrosion which was encountered by the contact feelers or heads 11 at a particular elevation in the pipe P. It will be observed that all of the deflections or indications 100 are in alignment, and therefore such indications 100 are in a circular plane passing through the cylindrical chart 15. Similarly, the deflections or indications 101 are also in alignment and would fall in the same circular plane of the cylindrical chart 15 and therefore are indicative or representative of either a collar or complete ring corrosion in the pipe P at that particular elevation. Of course, the collars and the ring corrosion can be differentiated from each other because the collars will appear at regular intervals on the chart. If a plurality of deflections or indications such as the indications 101 fall in the same circular plane and are therefore in alignment, but all of the styluses have not moved so that there are not indications or deflections 101 for each of the stylus members 14, that would indicate that only a portion of the pipe is corroded at that particular elevation, and therefore it would be indicated that a partial ring or area corrosion exists at that elevation. Isolated corrosion pits would be represented on the chart by irregularly spaced deflections or indications such as indicated at 102, 104, 105 and 106 in FIG. 16. Thus, it is believed evident that with the record produced by the calipering tool of this invention, it is possible to distinguish between collars, ring corrosion, partial ring corrosion or area corrosion, and isolated pits or corrosion areas.

Figure 17:
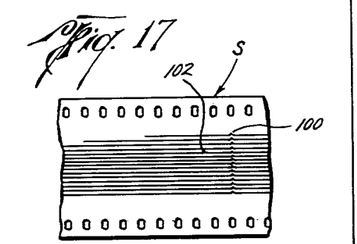
FIG. 17 is a plan view of a portion of a film to which the record on the cylindrical chart of FIG. 14 may be transferred to facilitate the examination and interpretation of the record.
Figure 18:
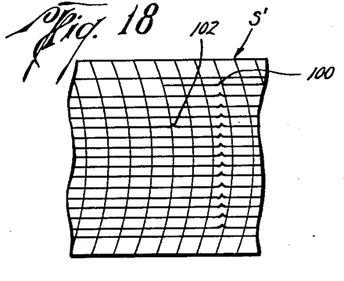
FIG. 18 is plan view of a portion of a chart strip to which the record on the cylindrical chart of FIG. 14 may be transferred if desired for facilitating the examination and interpretation of the record.

FIG. 17 illustrates a portion of film S to which the record lines from the cylindrical chart 15 have been transferred by any suitable optical means, preferably so that the deflections or indications such as the indications 100 are in lateral alignment. Isolated corrosion pits such as indicated at 102 in FIG. 17 are more easily distinguished and interpreted with the record lines positioned as indicated on the film S than when such record lines are positioned on the chart 15. Isolated corrosion pits are indicated as shown by the indication 102 in FIG. 17, as previously noted. FIG. 18 shows a chart strip S' wherein the indications 100 are shown in substantial lateral alignment in the same manner as illustrated in connection with the film S of FIG. 17. Such record may be made by known types of apparatus wherein the lines on the chart 15 are picked up with a contact point and electrically transmitted to a recording pen which makes the record on the chart S' for each of the lines on the chart 15. Although the transfer or converting of the record on the chart 15 to either the film S or the chart strip S' is desirable, it will be understood that the record produced on the cylindrical chart 15 may be interpreted without such conversion or transfer to the film S or S'.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A calipering tool for indicating variations in a surface calipered therewith, comprising a feeler adapted to engage said surface as said tool is moved relative to said surface, means for mounting said feeler for moving one portion thereof in response to the variations in said surface, means for placing another portion of said feeler under a lateral strain which varies in accordance with the moving of said one portion of said feeler, and means for mechanically converting said lateral strain into longitudinal movements of said another portion of said feeler which correspond accurately with the variable amounts of said strain for enabling a record to be made of said variations in said surface being calipered.

2. The structure set forth in claim 1, including a plurality of feelers in addition to said feeler circumferentially positioned for engagement with the internal surface of a pipe whereby a record of substantially the entire circumference of the pipe at each elevation throughout the length thereof may be produced.

3. A calipering tool for indicating variations in a surface calipered therewith, comprising a feeler adapted to engage said surface as said tool is moved relative to said surface, means for mounting said feeler for bending one portion thereof in response to the variations in said surface, means for placing another portion of said feeler under a lateral strain which varies in accordance with the bending of said one portion of said feeler, means for supporting said feeler intermediate of said one portion and said another portion, and means for indicating the variations in said strain to thereby indicate the variations in said surface being calipered.

4. A calipering tool for indicating variations in a surface calipered therewith, comprising a feeler extending longitudinally and adapted to engage said surface as said tool is moved relative to said surface, means for mounting said feeler for moving one portion thereof laterally in response to the variations in said surface, means for placing another portion of said feeler under a lateral strain which varies in accordance with the moving of said one portion of said feeler, means for supporting said feeler intermediate of said one portion and said another portion, means for indicating the variations in said strain to thereby indicate the variations in said surface being calipered, and means for recording the indications of the variations in said surface being calipered.

5. The structure set forth in claim 3, including a plurality of feelers in addition to said feeler circumferentially positioned for engagement with the internal surface of a pipe whereby an indication of the surface condition of substantially the entire circumference of the pipe at each elevation throughout the length thereof is obtained.

6. The structure set forth in claim 3, wherein said means for mounting said feeler for bending one portion thereof includes means for restraining said feeler against longitudinal movement at one point thereof, and wherein said support means includes means for preventing lateral movement of said feeler adjacent to said support means.

7. The structure set forth in claim 3, wherein said means for indicating the variations in said strain includes a chart, a recorder stylus operatively engaged with said chart, and means for transmitting the variations in said strain to said stylus to record same on said chart.

8. In a calipering tool having a housing, a plurality of feelers for engaging a surface to be calipered, and means for mounting said feelers in said housing, the improvement residing in said feelers and said means for mounting same wherein each of said feelers includes a first portion extending outwardly from said housing for engagement with the surface to be calipered and a second portion within said housing for converting the movements of said first portion of each feeler to a reduced scale, and wherein said means for mounting each of said feelers includes means within said housing for supporting each feeler at the mid-point between said first and second portions against longitudinal movement relative to said housing, and additional means for preventing lateral movement of the free end of said second portion of each feeler, whereby lateral movement of said first portion of said feeler in response to variations in the surface being calipered causes said second portion to be deformed or bowed in accordance with the amount of lateral movement of said first portion but on a reduced scale as compared to the amount of said lateral movement and the amount of the variations in the surface being calipered.

9. The structure set forth in claim 8, including a recorder means operable by said second portion of each feeler in response to the variations in the deformation or bowing to record such variations, whereby the variations in the surface being calipered are recorded on a reduced scale.

10. The structure set forth in claim 8, including a recorder means operable longitudinally by said second portion of each feeler in response to the variations in the deformation or bowing to record such variations, whereby the variations in the surface being calipered are recorded on a reduced scale.

11. The structure set forth in claim 8, including a recorder means operable laterally by said second portion of each feeler in response to the variations in the deformation or bowing to record such variations, whereby the variations in the surface being calipered are recorded on a reduced scale.

12. The structure set forth in claim 8, including a recording chart, means for moving said chart rotationally and longitudinally relative to said housing, and a recorder means in contact with said chart and operatively connected with said second portion of each feeler for making a record on said chart of the variations in the surface being calipered.

13. A calipering tool for indicating the variations in the inner surface of a pipe, comprising a housing having a plurality of circumferentially spaced longitudinal slots, an inner cage mounted within said housing, a plurality of feelers positioned within said housing with each of said feelers having a contact head extending through one of said slots for contacting said inner surface of the pipe, coacting means on said inner cage and each of said feelers for preventing longitudinal movement of said feelers at the location of such coacting means, each of said feelers having an extension beyond said coacting means, means within the housing for preventing lateral shifting of the end of each feeler extension relative to the housing whereby movement of each feeler from said contact head to said coacting means results in a bowing of each feeler extension in accordance with the extent of the movement of each feeler, a recorder means for each feeler operable in accordance with the movements of the feeler extension therewith, and a chart means in said housing engageable by said recorder means for recording the movements of each recorder means.

14. The structure set forth in claim 13, including resilient means mounted on said inner cage for maintaining each recorder means in operable engagement with each feeler extension as they move longitudinally together in accordance with the bowing of each feeler extension.

15. The structure set forth in claim 13, including a latch means for holding said contact heads on said feelers out of contact with said inner surface when said tool is moved in one direction in said pipe, and a release means operable by moving said tool in the other direction in said pipe to release said feelers for movement of said contact heads into contact with the inner surface of the pipe.

16. The structure set forth in claim 15, wherein said release means includes a roller adapted to engage said inner surface of said pipe, actuating means for utilizing the rotation of said roller to move said latch means to a position for releasing said feelers, and a one-way clutch for transmitting the rotation of said roller to said actuating means only when said tool is being moved in said other direction to caliper said inner surface of the pipe.

17. The structure set forth in claim 13, wherein said coacting means on said inner cage and each of said feelers includes recesses in said inner cage and in each of said feelers, and a ball positioned in each of the recesses in said inner cage with each ball extending into a recess in a feeler to thereby prevent longitudinal movement of the feeler at the location of each ball.

18. The structure set forth in claim 13, wherein said coacting means on said inner cage and on each of said feelers includes a coacting lug and recess with each feeler to thereby prevent longitudinal movement of each feeler.

19. The structure set forth in claim 13, wherein said coacting means on said inner cage and on each of said feelers includes a recess in each feeler, corresponding recesses in said inner cage, and a rod extending from each feeler recess to the corresponding recess in said inner cage.

20. A calipering tool for indicating the variations in the inner surface of a pipe, comprising a housing having a plurality of circumferentially spaced longitudinal slots, an inner cage mounted within said housing, a plurality of feelers positioned within said housing with each of said feelers having a contact head extending through one of said slots for contacting said inner surface of the pipe, coacting means on said inner cage and each of said feelers for preventing longitudinal movement of said feelers at the location of such coacting means, each of said feelers having an extension beyond said coacting means, means within the housing for preventing lateral shifting of the end of each feeler extension relative to the housing whereby bending of each feeler from said contact head to said coacting means results in a bowing of each feeler extension in accordance with the extent of the bending of each feeler, a recorder means for each feeler operable in accordance with the movements of the feeler extension therewith, a chart means in said housing engageable by said recorder means for recording the movements of each recorder means, and means for imparting rotational and longitudinal movement to said chart relative to said recorder means as said tool is moved in the pipe being calipered.

21. An article of manufacture suitable for use in a recording caliper comprising a housing, a beam extending into said housing and having a selected portion which is adapted to deform a predetermined amount upon being subjected to a selected bending moment, said beam extending in substantial alignment throughout its length, a feeler head on said beam, a support and a contact surface at spaced points on the beam and so arranged with respect to said selected portion thereof that movement of the feeler head imparts bending moment to said selected portion with the support serving as a fulcrum, said housing having contact means therewith which is contacted by said contact surface on said beam, and a stylus with the beam adapted to move in response to variations in the deformation of said portion.

22. The article of manufacture defined in claim 21 in which the feeler head is at one end of the beam, the contact surface is at the other end of the beam, and the support is in between said ends.

23. The article of manufacture defined in claim 21 in which the contact surface is curved.

24. A calipering tool for indicating variations in a surface calipered therewith, comprising a feeler adapted to engage said surface as said tool is moved relative to said surface, means for mounting said feeler for bending one portion thereof in response to the variations in said surface, means for placing another portion of said feeler under a strain which varies in accordance with the bending of said one portion of said feeler, and means for indicating the variations in said strain to thereby indicate the variations in said surface beng calipered, said means for mounting said feeler for moving one portion thereof including a retaining means at an intermediate point between said one portion of said feeler and said another portion thereof for preventing longitudinal movement of said feeler at said intermediate point during the moving of said one portion and the imparting of the strain to said another portion of the feeler.

25. A calipering tool for indicating variations in a surface calipered therewith, comprising a feeler adapted to engage said surface as said tool is moved relative to said surface, means for mounting said feeler for bending one portion thereof in response to the variations in said surface, means for placing another portion of said feeler under a strain which varies in accordance with the bending of said one portion of said feeler, and means for indicating the variations in said strain to thereby indicate the variations in said surface being calipered, said means for mounting said feeler for moving one portion thereof including a retaining means at an intermediate point between said one portion of said feeler and said another portion thereof for preventing longitudinal movement of said feeler at said intermediate point during the moving of said one portion and the imparting of the strain to said another portion of the feeler, and means for preventing lateral movement of the end of said feeler opposite from the end in engagement with the surface being calipered.

References Cited in the file of this patent

UNITED STATES PATENTS

| | | |
|---|---|---|
| 2,102,080 | Kinley | Dec. 14, 1937 |
| 2,325,299 | Bench et al. | July 27, 1943 |
| 2,495,797 | Whitlock et al. | Jan. 31, 1950 |
| 2,638,681 | Kinley et al. | May 19, 1953 |
| 2,656,613 | Goble | Oct. 27, 1953 |
| 2,721,110 | Price | Oct. 18, 1955 |
| 2,771,685 | Kinley | Nov. 27, 1956 |
| 2,853,788 | Kinley | Sept. 30, 1958 |